Feb. 21, 1967 HSUE C. TSIEN ETAL 3,305,458
OXYGEN DIFFUSION ANALYER AND METHOD OF USING SAME
Filed Sept. 6, 1963 3 Sheets-Sheet 1

HSUE C. TSIEN
HUGH H. HOROWITZ Inventors

By *Reuben Miller*

Patent Agent 3,305,458
OXYGEN DIFFUSION ANALYZER AND
METHOD OF USING SAME
Hsue C. Tsien, Livingston, and Hugh H. Horowitz, Elizabeth, N.J., assignors to Esso Research and Engineering Company, a corporation of Delaware
Filed Sept. 6, 1963, Ser. No. 307,229
9 Claims. (Cl. 204—1)

This invention relates to an improved apparatus and methods of use thereof to effect the determination of the quantity of a specific gas present in a gas sample stream. In particular, this invention involves a diffusion controlled galvanic cell suitable for the determination of oxygen concentrations in sample streams. The oxygen accurately detected by the apparatus and method of this invention ranges from a few p.p.m. to 100% of the sample stream.

Recently, there has been a great deal of interest in the analytical art for a method which would yield a quick and accurate determination of oxygen concentration in gas streams. A number of patents have issued, teaching the use of both polarographic or galvanic methods. Of the former, U.S. Patents 2,898,282 and 2,913,386 are of interest for showing the electrolytic reaction of oxygen at fixed, impressed potential levels. The second approach has been based on the interaction of oxygen with a cathodic electrode in a galvanic cell and measurement of the resulting current. Examples of this method include U.S. Patents 2,805,191 (trace amounts $O_2$), 2,943,028 (trace amounts of $O_2$), and 3,028,317 (up to 21% $O_2$ by use of a moving electrolyte film). Additionally, the system described in U.S. Patent 2,805,191 has been somewhat improved by Baker et al. as described in "Industrial and Engineering Chemistry," vol. 51, No. 6, June 1959, pp. 727–730.

However, the methods, as advanced by the above cited art, still suffer from the following basic deficiencies:

(1) gas streams having large concentrations of oxygen cannot be measured;
(2) the instruments are very sensitive to temperature change and require either constant temperature conditions or introduction of a temperature factor thereby requiring a burdensome calculation in order to obtain an accurate oxygen concentration figure;
(3) the instruments are sensitive to the flow rate of the sample; and
(4) some instruments require outside power supply and rather complicated circuitry.

It has now been discovered that oxygen analysis of gas streams containing up to 100% oxygen can effectively be accomplished by the use of a diffusion controlled galvanic cell. Furthermore, due to the novel details of construction and novel combinations and arrangement of parts of the present invention, which will more fully appear in the course of the following description, it is now possible to conduct such analyses essentially independent of temperature and flow conditions. The present apparatus further does not require an outside power source and contains only the simplest possible circuits thereby insuring longevity of operation with minimal maintenance.

The present invention generally is based upon the principle of the galvanic cell comprising two electrodes coupled by an electrolyte. The gas sample stream is introduced in such a manner so as to cause it to flow over the outermost electrode which functions as a cathode. Oxygen contained in the gas stream reacts at the cathode to form hydroxide ion and a small amount of hydroperoxyl ion as shown by the following equations:

(i)  $O_2 + 2H_2O + 4e \rightarrow 4OH^{\ominus}$
(ii) $O_2 + H_2O + 2e \rightarrow OH^{\ominus} + O_2H^{\ominus}$ Similarly, at the anode a corresponding series of half cell reactions take place. In the following equations, M represents the metal utilized as the anode and $n$ is its valence:

(iii) $M + nOH^{\ominus} \rightarrow M(OH)_n + ne$ (iv) 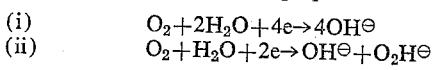

In the absence of oxygen in the gas stream, no reaction will occur in this cell, the cathode being selected from a metal not being reactable with the electrolyte at any time and the anode being reactable with the electrolyte only when oxygen is being reduced at the cathode.

The current produced by the cell is a direct function of the oxygen concentration in the gas sample stream contacting the cathode. This current is led through an external circuit connecting the electrodes and is measured. By calibrating the system against gas streams having known concentrations of oxygen, the current amplitude will yield a direct representation of the oxygen concentration contained in the sample.

When gas samples are introduced having large concentrations of oxygen, i.e. >21%, the responsivity of a galvanic cell such as has been described above is seriously reduced. The reason for this is that the output of the cell is no longer affected by the rate of diffusion of oxygen to the cathode at high oxygen concentrations. It may be that side reactions at the anode, such as direct chemical reaction with oxygen, limit the cell's performance at high oxygen partial pressures. For example, the side reaction at the anode might be $$2Pb + O_2 + 2H_2O \rightarrow 2Pb(OH)_2$$

This reaction would tend to drive the potential of the anode toward that of the cathode thereby reducing the output of the cell. Evidence for this is that physical decomposition of the anode is often observed at high oxygen partial pressures. It has now been found that this limitation on cell function at high oxygen partial pressures can be essentially eliminated by introducing a diffusion barrier which covers a part of the area between the cathode and anode. The height of this barrier can be selected so as to maintain maximum responsiveness in the cell at a lower over-all activity level. For example, the height of the barrier can vary from $\frac{1}{10}$ to $\frac{9}{10}$ the height of the cathode, preferably $\frac{4}{10}$ to $\frac{6}{10}$. This, of course, reduces the output of the cell but it definitely does not have the same effect as simply reducing the electrode areas. Reducing the electrode areas reduces the currents proportionately but does not change the current density or the flat slope of the output-oxygen concentration curve. Adding the diffusion barrier reduces the cell current, but increases the slope significantly, rendering the curve sufficiently linear that measurements can be made up to 100% oxygen concentration. Furthermore, the reduced currents yield a reduced anode current density which prolongs the life of the cell.

While the complete operation of the diffusion barrier is not fully understood, a tentative explanation is offered below, which, however, is not intended to prejudice this invention by excluding other alternatives. It is believed that the output of the cell is reduced by the fact that the pathway for the migration of ions (principally $OH^-$) through the electrolyte is lengthened by the obstructing barrier. However, due to the excellent conductivity of the KOH solution and the low current densities involved, the voltage drop due to resistance is not excessive, and areas on the anode and cathode on both sides of the diffusion barrier are still electrochemically active. However, the diffusion of oxygen through the electrolyte to the surface of the anode is drastically reduced due to the lengthened electrolyte pathway, the low solubility of oxygen and the small concentration gradient causing its diffusion. Thus, the chemical reaction of oxygen at the anode is no longer limiting the output of the cell and the output is again sensitive to the oxygen partial pressure at the cathode.

Such a system should be distinguished from the use of diffusion barriers between the cathode and the gas stream inlet which may effect a reduction in the activity in the cell but also and undesirably severely reduces cell responsiveness to changes in the oxygen content of the gas stream.

It has also been found that introduction of the diffusion barrier between the cathode and anode eliminates the substantial temperature dependence previously found in galvanic cells of this type. Again the suggested mechanism may explain this result. The side reaction of oxygen at the anode may be purely a chemical reaction of 10 kcal./mole or more activation energy. To the extent that it occurs therefore it increases the temperature sensitivity of the cell. The main oxygen electrochemical reaction at the cathode is primarily diffusion controlled, its rate depending on the solubility and diffusion constant of oxygen. Raising the temperature increases the diffusion constant but reduces the solubility of oxygen, thereby giving very little temperature sensitivity. The diffusion barrier, by accentuating the main reaction in relation to the side reaction, therefore decreases the temperature sensitivity of the cell. Furthermore, by specific design modifications in the gas stream inlet, it has now been found possible to pass the sample stream directly unto the cathode electrode. This method is far superior to the method employed in the prior art which involved bubbling the gas through the electrolyte pool at the bottom of the cell. These bubbles would haphazardly wet the cathode surface causing reaction surges thereupon. This resulted in a loss of sensitivity of the instrument at higher gas flow rates.

The present invention will be made more clearly evident by reference to the accompanying figures.

Figure 4:
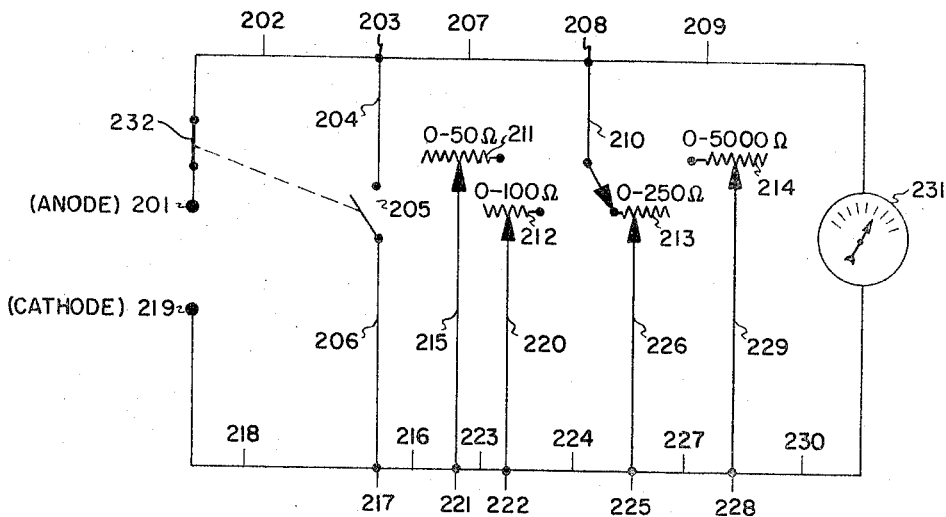
Figure 5:
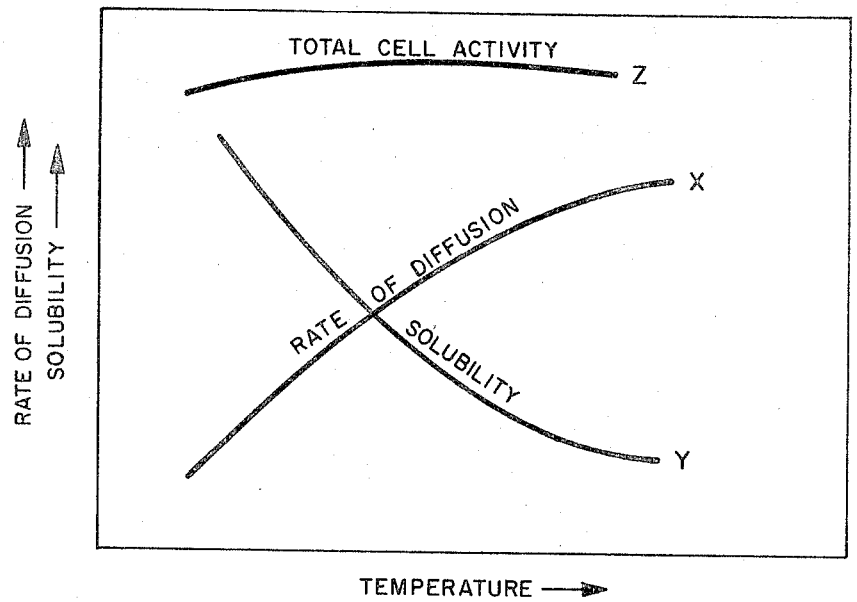

FIGURE 4 is a schematic diagram of the relatively simple circuit utilized with the oxygen analyzer; and FIGURE 5 is a graph showing the relationship between the temperature and the total cell activity when the cell output is limited primarily by the oxygen cathode. It is believed that this activity is the additive function of two variables, rate of diffusion and oxygen solubility in the electrolyte as explained above.

Figure 1:
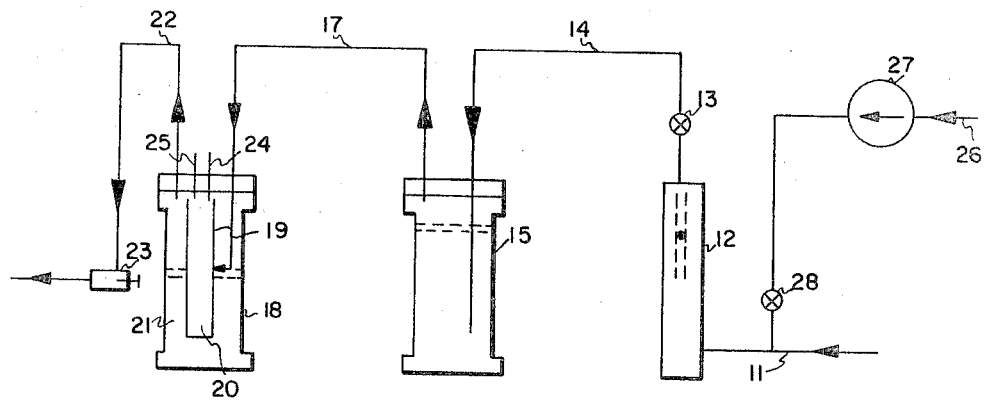
FIGURE 1 is a flow diagram of the oxygen analyzer system.

Turning now to FIGURE 1, the sample gas stream to be analyzed enters by means of gas inlet line 11. The rate of flow of the sample stream may be controlled by means of flow meter 12 and valve 13 although the system is relatively insensitive to changes to flow rates in the range of about 0.5 to 1.5 c.f.h. Since most sample feed stream rates will be within this range and since the system will still be rather insensitive to changes in feed rate outside of this range, the presence of flow meter 12 and valve 13 are helpful but by no means necessary to the successful functioning of the oxygen analyzer system. The sample stream then passes into prescrubber chamber 15 by way of line 14.

Prescrubber chamber 15 contains a dilute solution of the electrolyte utilized in the galvanic cell section. In a preferred embodiment of the present invention the prescrubber solution comprises a 12–18% KOH solution. Use of a prescrubber aids in saturating the sample stream with moisture and thus reduces evaporation loss in the electrolyte solution of the galvanic cell. Maintenance of a uniform electrolyte level is important in the galvanic cell since substantial changes in this level will result in irreproducibility of the cell's output. Additionally, the prescrubber serves to maintain the electrolyte concentration fairly constant in the galvanic cell section. In a preferred embodiment the electrolyte in the galvanic cell section comprised a 24% KOH solution. It has been found that passage of the sample gas stream through a prescrubber containing a more dilute, e.g. 12–18% KOH, prescrubber solution will effect sufficient entrainment of KOH in the gas to make up any losses incurred by the galvanic cell during operation. Use of a prescrubber having a KOH concentration which is about equivalent to that in the galvanic cell section or even more concentrated is to be avoided as this has been found to result in an increase in the galvanic cell electrolyte KOH concentration level above the desired 24% level. This KOH level was shown to provide optimum sensitivity by Baker et al., supra, at p. 728. Furthermore, the prescrubber serves another function in that it will remove undesirable gases from the sample gas. These gases, such as carbon dioxide, hydrogen sulfide, acetylene, hydrogen cyanide, sulfur dioxide, nitrogen dioxide, and the like, react with the electrolyte and, if present in the analysis cell, such reaction would mask the reaction due to the presence of oxygen.

When the sample gas stream contains large concentrations of $CO_2$ or other acid gases, e.g., 1% or more, it has been found advisable to utilize an electrolyte which will not react as actively as KOH. Such electrolytes include solutions of $CH_3COOH$, $KHCO_3$ and $KCl$. In these cases both the prescrubber and the galvanic cell section contain the substitute electrolytes.

Scrubbed gas containing some entrained electrolyte and moisture leaves prescrubber 15 by means of line 17. This gas is then carried to the galvanic cell section 18. The gas is allowed to pass upon cathode electrode 19, which is wrapped about core element 20 so as to cover a portion of core element 20's total area. In a preferred embodiment, the gas stream flowed at a direction perpendicular to the vertical axis of the core element when it contacted cathode 19. This can be accomplished by suitable modifications in the construction of the gas stream inlet into cell 18 which will be explained in greater detail later in this paper. Use of this perpendicular flow technique allows the gas stream to enter cell 18 at the electrode level directly and eliminates the necessity of bubbling the gas stream in through the electrolyte pool 21 which was previously shown to be undesirable for efficient operation of the electrolytic cell.

Core element 20 also contains an anodic electrode element which is located closer to the central core than cathode electrode 19. The two electrodes are separated by one or more layers of absorbent material which descends into electrolyte pool 21 and is wetted uniformly by the electrolyte due to capillary action. The wetted absorbent serves as an electrical path between the cathode and the anode due to the diffusion of the electrolyte through it. The electrical circuit is completed by means of leads 24 and 25 connecting the cathode and the anode, respectively, to the external measuring circuit. The construction of the core element and the electrode elements contained therein will be described in greater detail later.

The gas sample stream, after contacting core element 20 and its superimposed cathode electrode element 19, passes out of the cell by means of line 22 where it is led to the exhaust. This line may be controlled by the use of a valve 23, e.g. a needle valve, so as to prevent the introduction of air or other sources of oxygen-containing gas during the period when the cell is in an off condition.

When it is necessary to calibrate the system against gas streams containing known oxygen concentrations (e.g., air having a known oxygen content of about 21% or purified oxygen having an oxygen content of 99.9%), the calibrating gas may be introduced through line 26. A pump 27 may be provided to insure sufficient pressure to allow the calibrating gas to pass through the system. Calibration gas flow rate may be controlled by use of valve 28, which additionally serves to close off the system from line 26 when calibration is no longer needed.

Figure 2:
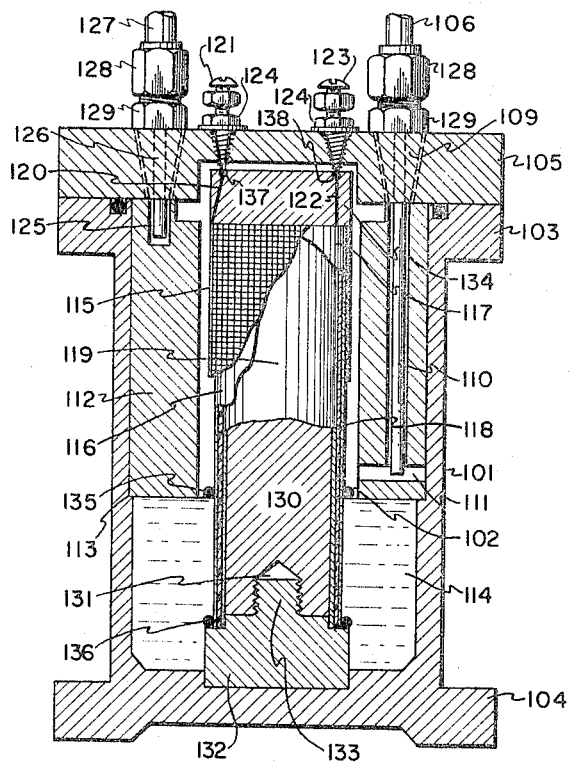
FIGURE 2 is a cross-sectional view taken through the central vertical plane of the galvanic cell section of the oxygen analyzer.

Turning now to FIGURE 2, a cross-sectional view through the central vertical plane of the galvanic cell section is shown in some detail. The cell section is constructed of a material resistant to attack by KOH. Preferably, the cell is made of acrylic (Lucite) which is inert to KOH and additionally is transparent thereby allowing direct examination of the cell during operation. Acrylic may also be utilized in the construction of the prescrubber described previously.

The galvanic cell section consists of an annular vessel 101 cast from acrylic having a central cavity section 102. The wall of vessel 101 is formed so as to have a greater cross-sectional thickness at its upper 103 and lower 104 vertical extremities than through the central portions of the wall. The thickened upper portion 103 serves as a support for cell cover 105 which may be secured to vessel 101 by the use of any suitable fastening means, e.g. bolts, screws, clamps, etc. It is preferred that stainless steel screws be used thus allowing quick and easy detachment of the cover whenever it is necessary to service the interior chamber. The thickened lower portion 104 may be suitably formed so as to perform the functions of a base support for the cell structure.

In the operation of the cell, the prescrubbed gas sample stream enters by means of inlet tube 106 which is connected to prescrubber chamber 15 by means of line 17 as described in FIGURE 1. Inlet tube 106 extends all the way down to the center of cross-drilled passage 111 by means of passage 109 bored through cover 105 and passage 110 bored through acrylic jacket 112. This jacket is supported in cavity 102 by means of indentation 113 in the inner side of the central portion of vessel 101.

In the embodiment depicted, inlet 106 is secured to cover 105 by means of threaded and taper lock fittings 128 and 129. As stated previously, inlet 106 communicates directly with passage 111, which has one end sealed off into a dead end so the gas will only flow into cavity 102. The flow modulated gas stream enters cavity 102 at a point above the level of electrolyte pool 114.

The gas stream then contacts the electrode assembly of the galvanic cell. This assembly is depicted in FIGURE 2 in a cross-sectional view through its various concentric layers in a preferred embodiment. The outermost portion of this assembly consists of the cathode electrode 115. This cathode is in the form of a screen electrode and is resistance-welded or lockseamed to form a complete cylinder. When the sample gas stream contains low concentrations of oxygen, e.g. <21%, it is preferred that cathode 115 be prepared from a silver screen having a mesh in the range of about 60 to 120. On the other hand, when high concentrations of oxygen are to be measured, e.g. >21%, it is desirable to use a Monel screen having a mesh in the range of about 60 to 120. Other materials which may be used as a cathode for oxygen analysis include nickel and stainless steel. However, such cathodes are not as sensitive as the desired forms and further may introduce noise into the circuit which seriously affects the reproducibility of results.

Cathode electrode 115 is maintained in contact with electrolyte pool 114, e.g., 24% KOH solution, by means of absorbent layer 116 which is formed as a concentric cylinder with a slightly smaller diameter than cathode electrode 115. The absorbent layer is of a length sufficient to contact electrolyte pool 114 and will draw up an amount of electrolyte by capillary action which will uniformly wet its surface. It has been found that a layer of laboratory filter paper, e.g., whatman No. 50 hardened filter paper, is eminently suited for this purpose and will stand up to saturation with 24% KOH for extended periods of time. An even more desirable material for this purpose is prepared from a porous Dacron.

Beneath the absorbent layer 116, a diffusion barrier layer 117 is introduced. In a preferred embodiment, this layer consists of a film of a nonporous, inert plastic such as polyethylene, polypropylene, nylon, Mylar, Teflon, etc., having a thickness within the range 0.0001" to 0.0300", preferably 0.0005" to 0.001". The diffusion barrier layer is also formed into a concentric cylinder having a diameter slightly less than that of the absorbent layer. This barrier acts as a partial shield between the cathode and anode. The activity of the cell can be changed by changing the height of the diffusion barrier and this should be done proportionately to the oxygen concentration in the sample gas stream, e.g. a high oxygen concentration should be measured with a cell employing a diffusion barrier of greater height than when a low oxygen level is being measured. For example, the diffusion barrier height may be from $1/10$ to $9/10$ the height of the cathode. When relatively high oxygen levels are being measured, it is preferred that the diffusion barrier height be between $4/10$ and $9/10$ the height of the cathode. A reduction in the cell's activity results in the continuation of the linearity of the function describing the relationship between the oxygen concentration and the current output of the cell to oxygen levels up to 100%. Without the employment of a diffusion barrier, this function has a slope approaching zero at oxygen concentrations above about 6.0%. Above this point, great changes in oxygen concentration produced very little change in the current output of the cell. See Baker et al., supra at 729.

A second absorbent layer 118 is located below the diffusion barrier layer 117 and is similar to the first absorbent layer in all respects except that it is formed into a concentric cylinder of lesser diameter. Due to the thinness of the diffusion barrier, the first and second absorbent layers will be in effective contact with each other at those portions of their length which are greater than the length of the diffusion barrier. This insures that an electrically conductive path between the cathode and anode will be obtained.

Anode 119 is formed into a concentric cylinder preferably from a single metal sheet. For the purposes of oxygen analysis, the use of a lead anode is most desirable. The anode is contacted by the second absorbent layer 118 and therefore will be surface wetted with electrolyte. Diffusion thus will be possible from the surface of cathode 115 to anode 119 except in that region where diffusion barrier 117 is interposed.

Current generated by the galvanic cell when oxygen is present in the gas stream is passed through an external circuit for measurement. Cathode 115 has a finger-like protruding element 120 which serves to form an electrical junction with terminal screw 121. Similarly, anode 119 is also equipped with a protruding element 122 which allows electrical contact to be made with terminal screw 123. Excess cathode and anode materials are contained in the countersunk recesses 137 and 138 so that good contacts can be made by tightly screwing down screws 121 and 123. Wires from the external circuit are placed about each terminal screw and are secured against terminal 124 for the cathode and anode leads, respectively, by rotation of the terminal screws.

Exhaust gas passes out through outlet tube 127 which extends down through drilled passages 125 and 126. Outlet tube 127 is held in fixed relationship to channel 126 by means of threaded and taper lock tube fittings 128 and 129 in the same manner as previously described for inlet tube 106.

For purposes of convenience, the concentric layers of the electrode assembly are best constructed about a central annular spindle 130 cast from acrylic. This spindle has a circular, threaded cavity 131 extending a short distance into the center of one of its ends. A plug element 132 has a threaded protrusion 133 which is threadably attachable to spindle 130 by means of cavity 131. This plug 132 helps to locate the spindle in a central position in vessel 101. Additionally, spindle 130 has a cap section 134 located at the end opposite cavity 131. This cap section contains two bore holes and countersunk cavities 137 and 138 through its vertical axis which bore holes are adapted to provide a passageway for electrode protrusions 120 and 122.

Replacement of the entire electrode assembly is thereby made extremely simple. Cover 105 is disengaged by removing the holding means utilized to secure it to wall section 103. The spindle assembly can then be lifted out directly. In order to maintain the various layers securely in place, it is desirable to place two O rings around the entire assembly at 135 and 136 (shown in the drawing in cross section). Since these O rings are in constant contact with the electrolyte, it is preferred that these O rings be made of materials which are relatively inert such as butyl rubber or Teflon.

Figure 3:
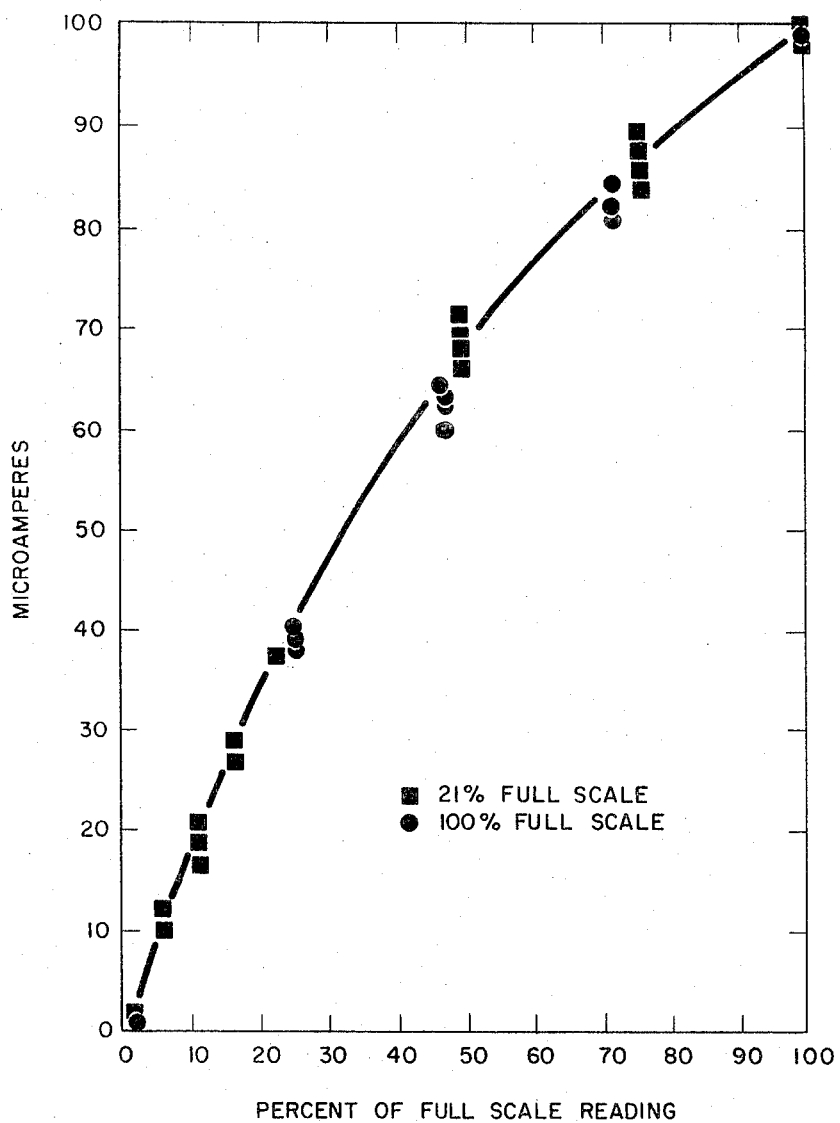
FIGURE 3 is a calibration graph showing the responsiveness of the cell current over a wide range of oxygen concentrations.

FIGURE 3 is a graph showing the responsiveness of the current output of the system of the present invention to various concentrations of oxygen. The square points represent readings taken when the system is calibrated to a full scale reading equal to 21%. Thus, for example, a current reading of about 70 microamperes represents about 50% of the full scale reading and indicates an oxygen concentration of about 10.5% (i.e., 50% of the full scale reading of 21%). Similarly, when the system is calibrated to a full scale reading being equal to 100%, as is represented by the round points, and a current of about 70 microamperes is obtained, an oxygen concentration of about 50% is indicated (i.e., 50% of the full scale reading of 100%). The response of the cell, as indicated by the shape of the curve, is thus seen to be virtually constant over the entire range of 0-100% oxygen concentration. While the curve deviates somewhat from complete linearity at the higher limits of each scale, the slope still remains sufficiently high to give a sensitive representation of the current-oxygen concentration relationship. Thus, relatively small changes in the oxygen concentration at 20%+ and 90%+ levels yield discrete and reproducibly measurable changes in the current output.

Turning now to FIGURE 4, a schematic diagram of the external circuit used to measure the current output of the galvanic cell is shown. Anode 201 is connected by lead 202 to junction 203 and lead 204. On-off switch 205 is inserted between leads 204 and 206 and by means of junction 217, lead 218 and cathode 219 serves to form a complete subcircuit through the cathode-anode couple. When switch 205 is open, the main circuit will carry the current generated by the cell. However, when switch 205 is closed across leads 204 and 206, a low resistance circuit is formed which will short circuit the main circuit. Current will continue to flow in the subcircuit until the oxygen concentration at the cathode is reduced to essentially the zero level. Another on and off switch 232 can be incorporated either in the anode or cathode lead circuit to shut off the electrolytic activity when the analyzer is not in use, especially if the analyzer, for some reason, has to be continuously exposed to air or analyzing streams. There can be an interconnecting operation so that the series switch 232 is on while the shunt switch 205 is off and vice versa.

Lead 207 connects junction 203 to junction 208 and full scale selector switch 210. This switch completes a subcircuit through one of four resistors, 211 (0–50 ohm), 212 (0–100 ohm), 213 (0–250 ohm) and 214 (0–5000 ohm). Resistor 211 completes the circuit through lead 215 and junction 221 while similar functions are provided resistor 212 by lead 220 and junction 222, resistor 213 by lead 226 and junction 225 and resistor 214 by lead 229 and junction 228.

Meter 231 is linked in parallel to the resistor subcircuit by means of leads 209 and 230. This meter may be a conventional micro ammeter with a full scale of 100 microamperes or for high sensitivity, a full scale of 2 or 3 microamperes. The dial of the meter may have a regular microamperes face which then would require the operator to utilize a calibration curve such as depicted in FIGURE 3 to convert the current being observed to an oxygen concentration figure. For the sake of convenience a dial may be employed which represents the nonlinear function shown in FIGURE 3 and would thus read out the oxygen concentration directly.

The main circuit is completed between meter 231 and the various resistor subcircuits by means of leads 227, 224, 223 and 216. Operation of the instrument proceeds as follows: Close switch 232 and open switch 205 when a sample gas stream is in contact with cathode 219. Current proportional to the concentratoin of the oxygen in the sample gas will flow through the main circuit to meter 231. Selector switch 210 is adjusted to the resistor level that will allow the current in the circuit to be read on scale in meter 231. In the embodiment shown, the oxygen concentration levels corresponding to the various resistance values given are for illustration:

| Resistance level: | Full scale oxygen concentration |
|---|---|
| 0–50 ohms | percent 0–100 |
| 0–100 ohms | do 0–21 |
| 0–250 ohms | do 0–10 |
| 0–5000 ohms | p.p.m. 0–100 |

FIGURE 5 represents a graph showing the general relationship of the activity of the apparatus of the present invention to the temperature. As has been indicated previously, the cell activity is virtually independent of the ambient temperature conditions. It is believed that this is a result of the additive relationship between the rate of diffusion and oxygen solubility variables which variables are thought determinative of the total cell activity. The rate of diffusion of charged particles from the cathode to the anode will increase a function of increasing temperature as indicated by curve X. On the other hand, the solubility of oxygen in the electrolyte film contacting the cathode will decrease as a function of increasing tempertaure as indicated by curve Y. The over-all activity of the cell will thus depend on the efficiency of transfer of particles between the electrodes and the amount of oxygen available for reaction at the cathode. Curve Z represents the additive function of curves X and Y and due to the compensating nature of the slopes of these curves, the resultant curve Z represents an almost temperature independent function.

The possible reason for the failure of the apparatus of the prior art using galvanic cells to achieve temperature independence may be attributed to the fact that these cells did not introduce the diffusion barrier as contemplated by the present invention. Therefore, in the previous cells, there was no obstruction to free particulate flow between the electrodes and thus the transfer rate was not rate controlling as to the overall cell activity. On the other hand, by introduction of a diffusion barrier in the present case, the diffusion rate has now become rate controlling and appears as a function in the overall activity equation as is depicted graphically in FIGURE 5 with the resulting effect of compensating for the change in the solubility of oxygen in the electrolyte due to changing temperature.

While the apparatus of the present invention has been disclosed in some detail, it should be noted that the invention is not limited to the particular embodiments described. Extensive changes may be made by one skilled in the electrochemical analysis without departing from the spirit of this disclosure. Examples of the wide variety of electrode materials, electrolytes and absorbents useable in galvanic systems are described in the patents and reference article cited previously in this paper. The improvement comprising the present invention may be utilized with good effect on these modified systems and these systems as such are incorporated by reference in the present invention. Additionally, the galvanic cell method may be utilized for the analysis of other components in gas streams besides oxygen. Such methods are outlined in U.S. Patent 3,028,317 at column 6, lines 46–62, and may properly be considered in conjunction with the disclosures of the present case as useful embodiments of this invention.

Summarily, the main advantages derived from the use of the diffusion controlled galvanic cell system of the present invention include:

(1) Greater range of sensitivity to increased concentrations of specific gases to be measured in sample gas streams.
(2) Temperature independence.
(3) Insensitivity to flow rate changes in the gas sample stream over a very wide range of flow.
(4) Simplicity and portability of the apparatus used.
(5) Ease of replacing entire electrode assembly.
(6) Ability to handle a wide variety of sample gas streams containing: argon, nitrogen, helium, carbon monoxide, carbon dioxide, methane and other hydrocarbons, hydrogen, etc.
(7) No external power source is needed and the output of the cell itself is low voltage and low impedance and therefore does not constitute an explosion hazard.

What is claimed is:

1. An improved galvanic cell for analysis of a gas mixture stream for an extended concentration range of a specific gas contained therein, said cell comprising in combination:
    (A) a container having a restraining wall, sample gas stream inlet and outlet means, an electrolyte pool, and electrode assembly supporting means;
    (B) an electrode assembly adapted to be supported within said container in such a manner as to be directly contacted by a sample gas stream from said sample gas stream inlet means, said electrode assembly comprising in combination a series of contiguous, concentric cylindrical elements wherein said elements comprise in respective order from the external surface:
        (i) a first electrode reactable with said specific gas;
        (ii) a first absorbent layer;
        (iii) nonporous, inert, electrically insulating diffusion barrier means;
        (iv) a second absorbent layer, which layer contacts said first absorbent layer for at least a portion of its surface area;
        (v) a second electrode;
    (C) an electrolyte pool which pool is in contact with a portion of said first and second absorbent layers so as to cause these layers to be wetted by the electrolyte;
    (D) current means adapted to receive current generated by said first and second electrodes when the said specific gas is present in the cell; wherein said first electrode is not reactable with said electrolyte at any time and said second electrode is reactable only when said specific gas is present in the cell.

2. The galvanic cell of claim 1 wherein gas stream prescrubber means are operationally connected to said sample gas stream inlet means.

3. The galvanic cell of claim 1 wherein said sample gas stream inlet means consists of a first and a second passageway, each passageway having a first and second end, said passageways being located within the said restraining wall of the container, wherein the first end of said first passageway is adapted to receive a gas sample stream, the second end of said first passageway interconnects perpendicularly with said second passageway at a point located between the first and second ends of said second passageway, the first end of said second passageway is sealed off to prevent the escape of gas and wherein further the second end of said second passageway is adapted to allow the sample gas stream to contact said first electrode at a point above the level of the electrolyte pool.

4. The galvanic cell of claim 1 wherein said diffusion barrier means comprises an inert, nonporous plastic film having a thickness within the range of 0.0001″ to 0.030″ and a height selectable according to the concentration range of the specific gas contained in the sample gas stream.

5. The galvanic cell of claim 1 wherein said electrode assembly contains a central core element positioned internally of said second electrode, which core element is detachably attached to said electrode assembly supporting means whereby the entire electrode assembly may be removed from the cell as a single unit.

6. An improved galvanic cell for the analysis of oxygen in concentrations ranging from trace amounts to about 100% of the sample gas streams, said cell comprising in combination:
    (A) A container having a restraining wall, sample gas streams inlet and outlet means, an electrolyte pool, and electrode assembly supporting means, wherein said sample gas stream inlet means consists of a first and a second passageway, each passageway having a first and second end, said passageways being located within the said restraining wall of the container, wherein the first end of said first passageway is adapted to receive a gas sample stream, the second end of said first passageway interconnects perpendicularly with said second passageway at a point located between the first and second ends of said second passageway, the first end of said second passageway is sealed off to prevent the escape of gas, and wherein further the second end of said second passageway is adapted to allow the sample gas stream to contact said first electrode at a point above the level of the electrolyte pool;
    (B) An electrode assembly adapted to be supported within said container in such a manner to be directly contacted by a sample gas stream from said sample gas stream inlet means, said electrode assembly comprising in combination a series of contiguous, concentric cylindrical elements wherein said elements comprise in respective order from the external surface:
        (i) a cathodic electrode prepared in the form of a fine mesh screen from a metallic material selected from the group consisting of silver and Monel;
        (ii) a first absorbent layer;
        (iii) a nonporous, inert plastic film having a thickness in the range between 0.005″ to 0.001″ and a height selectable according to the concentration range of oxygen contained in the sample gas stream whereby a diffusion barrier is obtained for the area covered by said plastic film;
        (iv) a second absorbent layer, which layer contacts said first absorbent layer for at least a portion of its surface area, wherein a portion of said first and said second absorbent layers contact said electrolyte pool so as to cause these layers to be wetted by the electrolyte;
        (v) a lead anodic electrode;
    (C) Current measuring means adapted to receive current generated by said cathodic and anodic electrodes when oxygen is present in the cell, whereby said current is measured and the concentration of oxygen determined independent of the sample gas stream flow rate and the ambient temperature.

7. A process for analyzing a sample gas stream for its content of a specific gas comprising:
    (A) Contacting a sample gas stream with a first electrode of a galvanic cell which first electrode is coupled to a second electrode by means of a diffusion medium wetted by an electrolyte, wherein the first electrode is not reactable with the electrolyte at any time and the second electrode is reactable with the electrolyte only when the specific gas is present at the first electrode;

(B) Introducing a nonporous, inert, electrically insulating diffusion barrier of area that is selectable but smaller than that of the diffusion medium between said electrodes to reduce the extent of coupling between them; and (C) Measuring the amount of electric current between the electrodes, which current will be a function of the concentration of the specific gas.

8. The process of claim 7 wherein the sample gas stream flow rate is modulated prior to contacting it with the first electrode.

9. The process of claim 7 wherein the sample gas stream is prescrubbed prior to contacting it with the first electrode.

References Cited by the Examiner

UNITED STATES PATENTS

| 3,001,918 | 9/1961 | Czuha | 204—195 |
| 3,050,371 | 8/1962 | Dowson et al. | 204—195 |
| 3,096,258 | 7/1963 | Poulos | 204—195 |

FOREIGN PATENTS

| 628,840 | 9/1949 | Great Britain. |

JOHN H. MACK, *Primary Examiner.*

T. H. TUNG, *Assistant Examiner.*